United States Patent [19]

Reiners et al.

[11] Patent Number: 5,434,222
[45] Date of Patent: Jul. 18, 1995

[54] PROCESS FOR THE PREPARATION OF POLYCONDENSATES

[75] Inventors: Jürgens Reiners, Leverkusen; Karl Leiritz, Monheim; Fritz Puchner, Cologne, all of Germany

[73] Assignee: Bayer Aktiengesellschaft, Leverkusen, Germany

[21] Appl. No.: 966,250

[22] Filed: Oct. 26, 1992

[30] Foreign Application Priority Data

Nov. 4, 1991 [DE] Germany ............ 41 36 289.6

[51] Int. Cl.⁶ ............................................ C08G 69/48
[52] U.S. Cl. ............................ 525/432; 525/430; 525/435; 524/538; 524/845; 528/323; 528/324; 528/342
[58] Field of Search ............ 525/432, 430, 435; 524/538, 845; 528/342, 323, 324

[56] References Cited

U.S. PATENT DOCUMENTS

| | | |
|---|---|---|
| 2,780,562 | 2/1957 | Reinhartz et al. . |
| 3,352,833 | 11/1967 | Earle et al. . |
| 4,250,298 | 2/1981 | Lehmann et al. ............ 528/342 |
| 4,328,142 | 5/1982 | Hertel et al. . |
| 4,450,045 | 5/1984 | Hertel et al. ............ 525/430 |
| 4,775,744 | 10/1988 | Schilling et al. ............ 530/501 |
| 4,857,586 | 8/1989 | Bachem et al. . |
| 4,975,499 | 12/1990 | Bachem et al. . |
| 5,017,642 | 5/1991 | Hasegawa et al. ............ 525/430 |
| 5,019,606 | 5/1991 | Marten et al. . |
| 5,171,795 | 12/1992 | Miller et al. ............ 525/430 |

FOREIGN PATENT DOCUMENTS

| | | |
|---|---|---|
| 0033104 | 1/1981 | European Pat. Off. . |
| 0182653 | 11/1985 | European Pat. Off. . |
| 0374938 | 6/1990 | European Pat. Off. . |
| 908133 | 4/1954 | Germany . |
| 908328 | 12/1955 | Germany . |
| 3708544 | 9/1988 | Germany . |
| 3808741 | 9/1989 | Germany . |
| 3822490 | 1/1990 | Germany . |
| 3914047 | 10/1990 | Germany . |
| 4101822 | 7/1992 | Germany . |

OTHER PUBLICATIONS

Japanese Abstracts, p. 18, J6 1167–410–A, Jul., 1986, Dow Chemical Co.

*Primary Examiner*—Paul R. Michl
*Assistant Examiner*—P. Hampton-Hightower
*Attorney, Agent, or Firm*—Sprung Horn Kramer & Woods

[57] ABSTRACT

The new process for the preparation of polycondensates from polyamidoamines, epichlorohydrin and if appropriate polyamines, unreacted epichlorohydrin being removed by passing an inert gas through the reaction mixture, produces salt-free reaction products which have very low organic chlorine contents and at the same time very low values for dichloropropanol, chloropropanediol and epichlorohydrin, and are excellently suitable as auxiliaries for paper and textiles.

9 Claims, No Drawings

PROCESS FOR THE PREPARATION OF POLYCONDENSATES

BACKGROUND OF THE FIELD OF THE INVENTION

The present invention relates to a new process for the preparation of water-soluble, self-crosslinkable, storage-stable polycondensates having a low organic chlorine content and a low dichloropropanol, chloropropanediol and epichlorohydrin content by reaction of polyamidoamines and, if appropriate, polyamines with epichlorohydrin, the unreacted epichlorohydrin being removed with an inert gas, and to the use of the polycondensates as auxiliaries in papermaking or for after-treatment of textiles.

DESCRIPTION OF RELATED ART

It has been known for a long time that reaction products of polyamidoamines and/or polyamines with epichlorohydrin are suitable for improving the wet strength of paper.

The improvement of wet strength and storage stability was the preferred target for developments in this field. However, most of the known wet strength agents have too high an organic chlorine content.

The organic chlorine content of the wet strength agent is composed of the content of chlorohydrin groups of the resin and a chlorine content which originates from low molecular weight by-products formed from epichlorohydrin during the synthesis. These are dichloropropanol (DCP) and chloropropanediol (CPD).

For use as a wet strength agent, an aqueous solution of the polycondensate is added to a pulp suspension from which the sheet of paper is formed by removal of water. If adsorption of the resins on the cellulose is incomplete, a certain proportion of organic halogen compounds enter the waste water from the paper production, and can be detected there as the so-called AOX value (DIN 38409 H14).

Proposed solutions for reducing the organic chlorine content of the polycondensates are already known from the prior art. These processes are essentially based on after-treatment of the reaction products with inorganic bases. Nevertheless the products obtained by this process are not satisfactory in respect of all requirements. Thus, for certain uses, for example use in the laminated paper sector, the wet strength is still in need of improvement in comparison with conventional wet strength agents. Furthermore, the products contain certain amounts of inorganic salts which are formed from inorganic bases and acids used in the stabilisation step.

German Offenlegungsschrift 3 708 544 and German Offenlegungsschrift 3 808 741 describe wet strength agents which, because of the base treatment which takes place during their preparation, already have considerably lower organic chlorine contents than conventional wet strength agents, an adequate storage stability also being achieved.

According to U.S. Pat. No. 3,352,833, a wet strength agent is after-treated with sodium hydroxide solution for about 4 hours before use, and is then employed immediately. Disadvantages of this procedure are that adequate reduction of the organic chlorine content does not take place, the resin solution is not storage stable, that is to say must be used within a short time, and furthermore numerous problems arise for the user of the products because additional apparatus installations are required for metering the base and the resin. In comparison experiments, resin solutions which did not have an adequate storage stability and had scarcely reduced organic chlorine contents were obtained.

German Offenlegungsschrift 3 822 490 claims polyamidoamine/epichlorohydrin resins, during the preparation of which a base treatment is also carried out and of which the content of organically bonded chlorine is stated as being not more than 4% by weight. However, reworking of Example 8 (product having the lowest organic chlorine content) did not give the stated low organic chlorine content of 1.0%, but an organic chlorine content of 2.4%, in each case based on the resin.

A process for the preparation of crosslinkable resins which prescribes no base treatment and leads to products which have a very low content of dichlorohydrin (corresponding to dichloropropanol, DCP) is known from EP-A 0 374 938; however, no data are given on the organic chlorine content. Reworking of the examples and analysis of the resulting polycondensates showed considerably higher values for the organic chlorine contents.

There was accordingly the object of providing an improved process for the preparation of polycondensates having low organic chlorine contents, the adverse effects of after-treatment with a base being avoided.

SUMMARY OF THE INVENTION

A new process has now been found for the preparation of polycondensates by reaction of
- A1) a basic polyamidoamine and/or
- A2) a polyamine, which optionally contains hydroxyl groups, with
- B) epichlorohydrin, partial crosslinking of the reaction product of A1) and/or A2) with B) and subsequent reaction with acids C), which is characterised in that 0.3 to 1.0 mol of epichlorohydrin are employed per mol of the total basic N atoms present in components A1) and A2), and the total concentration of components A1), A2) and B) in the solvent employed at the start of the reaction does not exceed 35% by weight, and in that an inert gas is passed through the reaction mixture before and if appropriate also during the partial crosslinking.

Surprisingly, the polycondensates prepared by the process according to the invention have very low organic chlorine contents of less than 5% by weight, and at the same time also very low values for dichloropropanol of not more than 0.5% by weight, and for chloropropanediol of not more than 0.5% by weight (in each case based on the solid resin), as well as very low contents of free epichlorohydrin of less than 50 ppm, coupled with a very good wet strength action.

Clear aqueous cationic polycondensate solutions which have a shelf life at room temperature of months, preferably 3 to 6 months, are obtained with a high space/time yield under conditions which are easy to handle industrially and under conditions which are considerably improved from the ecological point of view by the process according to the invention.

DETAILED DESCRIPTION OF THE INVENTION

The reaction of components A1) and/or A2) with B), which essentially comprises addition of B) onto A1)

and/or A2), is in general carried out at a temperature below 35° C., preferably at a temperature from 5° to 30° C., and at a pH of greater than or equal to 7, in particular at an initial pH of between 10 and 12, which falls slowly in the course of the reaction.

At temperatures above 35° C., further reaction of residual epichlorohydrin still present in the reaction mixture with the HCl formed during the condensation to give the undesired dichloropropanol is in general promoted.

The initial pH is in general determined by the concentration and basicity of components A1) and/or A2).

Initial pH values of >12 promote hydrolysis of the still unreacted epichlorohydrin to give the undesired chloropropanediol. Initial pH values of <7 promote the formation of dichloropropanol.

The reaction of A1) and/or A2) with B) essentially comprises an addition reaction of B) onto A1) and/or A2), an intermediate reaction product being formed, which is then partly crosslinked.

Partial crosslinking is to be understood as meaning the condensation of a number of, for example n, chlorohydrin groups of the type

to form sequences such as

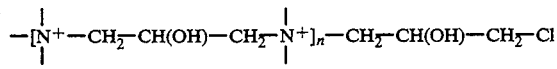

In the case where A1) and A2) are reacted with B, the polyamine A2) can be added to the reaction mixture containing the polyamidoamine A1) together with the polyamidoamine A1) at the start or in the course of the reaction, at a later point in time.

For carrying out the process according to the invention, 0.3 to 0.85 mol of components B) are preferably employed per mol of the total basic N atoms present in components A1 ) and A2 ) .

Molar ratios of less than 0.6 mol are in general preferred if a somewhat lower wet strength action is sufficient. If 0.7 to 0.9 mol of epichlorohydrin is employed per mol of basic N atoms of component A), products which are not inferior in wet strength action to the conventional wet strength agents based on excess epichlorohydrin are obtained. Under certain conditions, in contrast to the prior art, it is thus not necessary to employ epichlorohydrin in excess in order to achieve a good wet strength action.

The reaction time of the reaction of A1) and/or A2) with B) at a temperature of below 35° C. should be 30 to 300 minutes, preferably 60 to 240 minutes. Shorter reaction times in general result in a deterioration of the wet strength action, while longer reaction times usually reduce the space/time yield.

The total concentration of components A1) and/or A2) and B) at the start of the reaction is preferably 10 to 35% by weight, in particular 10 to 25% by weight, and especially preferably 12 to 19% by weight.

The passing through of an inert gas before the partial crosslinking of the reaction product of A1) and/or A2) with B) to remove unreacted epichlorohydrin is started at the earliest 30 minutes, preferably 60 minutes, after the addition of the epichlorohydrin has ended, and is preferably continued until the content of free epichlorohydrin in the reaction mixture is less than 0.1% by weight.

In general, it has proved sufficient to pass the gas through the reaction mixture for up to 3 hours at temperatures of, for example, 20° to 35° C.

In all cases, passing through of the inert gas must be started before the temperature is increased for the partial crosslinking.

In certain cases, it may be advantageous also to continue passing in the inert gas during the subsequent partial crosslinking and up until the end of the synthesis, the content of free epichlorohydrin decreasing to values of <50 ppm. However, the total duration of passing in the inert gas should then be continued for at least 60 minutes at an elevated temperature of, for example, 35° to 80° C.

In the process according to the invention, the inert gas is preferably circulated. After leaving the reaction mixture the stream of gas contaminated with epichlorohydrin is passed through a condenser or a wash solution and is then recycled into the reaction vessel. The epichlorohydrin removed from the circulation in this manner can be recovered for further syntheses. Additional degassing of the products, for example by vacuum distillation, to remove residual monomers is therefore not necessary.

However, the desired effect, i.e. that of reducing the content of free epichlorohydrin (measurement with the aid of gas chromatography during the synthesis) to a content of <0.1% before the partial crosslinking is started, must be achieved. This means that the end product contains less than 0.1% of dichloropropanol and/or chloropropanediol.

For partial crosslinking of the intermediately formed reaction product of A1) and/or A2) with B), the temperature is increased to 35° to 80° C., preferably 40° to 60° C., if appropriate after dilution to a concentration of between 5 and 20% by weight, preferably between 10 and 15% by weight. As a result of increasing the temperature, accelerated partial crosslinking of the polycondensate which has been freed from residual monomers by passing through inert gas takes place. Condensation is carried out at this temperature until the viscosity (based on the viscosity of a 15% strength solution at 25° C.) lies in the range between 10 and 150 mPas. A viscosity at which the reaction products are still water-soluble is preferably aimed for. The duration of the condensation depends on the desired viscosity. In all cases, however, complete premature crosslinking must be prevented by prompt acidification with acids C).

As well as being determined via the viscosity, the degree of crosslinking can also be determined via the degree of reaction of the chlorohydrin groups in the intermediately formed reaction product of A1) and/or A2) with B). Crosslinking is preferably carried out until at least 50 mol% of the chlorohydrin groups in the intermediate reaction product have reacted to form chloride.

At a viscosity of <10 mPas, the maximum wet strength is not achieved. At a viscosity of >150 mPas, the storage stability of the end product decreases and the wet strength also does not correspond to the optimum. In all cases, the maximum viscosity is determined by the fact that products which are still soluble are formed.

It is furthermore advantageous if up to 10 mol% of polyamidoamine A1) and/or polyamine A2), based on the particular polyamidoamine A1) and/or polyamine A2) employed at the start, is subsequently metered in during the partial crosslinking. The reaction time can then be shortened further, and the content of organically bonded chlorine can be reduced.

As soon as the desired solution viscosity is reached, a pH of between 2 and 5, preferably 2.5 and 4, is established by addition of acids C). Lower pH values lead to hydrolytic degradation of the polyamidoamine units, which manifests itself in a slow decrease of the solution viscosity during storage. pH values above 4 reduce the storage stability of the resin solutions because of premature complete crosslinking, during which the product becomes insoluble.

As a rule, 0.1 to 2 mol of acid are required for stabilisation per mol of epichlorohydrin employed. If required, the solids content can then still be corrected.

Suitable basic polyamidoamines A1) for the preparation of the water-soluble, self-crosslinking polycondensates are condensation products comprising structural units which are derived from a) aliphatic and/or aromatic dicarboxylic acids or functional derivatives thereof and
b) polyamines which contain at least two amino groups which are capable of amide formation and at least one further secondary or tertiary amino group and, if appropriate,
c) polyamines which contain two amino groups which are capable of amide formation and, if appropriate,
d) omega-aminocarboxylic acids and/or lactams, 0.8 to 1.2 mol of component b) and, if appropriate, up to 0.8 mol of component c) and, if appropriate, up to 1.5 mol of component d) preferably being employed in each case per mol of component a), with the proviso that the molar ratio of (b)+c)):a) assumes values of between 0.8:1 and 1.2:1.

Possible basic polyamidoamines A1) are also those in which up to 20 mol% of the secondary basic amino groups present have been converted into tertiary amino groups by alkylation. Alkylation here is to be understood as meaning reaction of the secondary amino groups with alkyl halides, dialkyl sulphates, alkyl alkanesulphonates and acrylic compounds.

The following alkyl halides may be mentioned as examples: methyl chloride, ethyl chloride, chloropropanol, chloroethanol and chloropropanediol.

Dialkyl sulphates are, for example: dimethyl sulphate, diethyl sulphate and dipropyl sulphate.

The following alkyl alkanesulphonates may be mentioned as examples: methyl methanesulphonate, ethyl methanesulphonate and chloropropyl ethanesulphonate.

The following acrylic compounds may be mentioned as examples: acrylonitrile, acrylamide, methyl acrylate, ethyl acrylate, butyl acrylate and isobutyl acrylate.

Preferred polyamidoamines A1) have, for example as an aqueous solution having a concentration of 50% by weight, a viscosity of 200 to 600 mPas at 25° C. and a base equivalent weight of between 300 and 700 g/equivalent of basic nitrogen, and have an average molecular weight $M_n$ in the range between 500 g/mol and about 10,000 g/mol.

The dicarboxylic acids a) employed preferably correspond to the formula $$R^9-O-CO-(CH_2)_e-CO-O-R^{10} \quad (III)$$

in which
$R^9$ and $R^{10}$ independently of one another represent hydrogen or $C_1$-$C_6$-alkyl and
e represents 0 to 10.

Mixtures of dicarboxylic acids or derivatives thereof, such as esters or anhydrides, can of course also be employed in the preparation of the polyamidoamines A1). The following dicarboxylic acids a) or dicarboxylic acid derivatives may be mentioned as examples: oxalic acid, malonic acid, succinic acid, glutaric acid, adipic acid, sebacic acid, dimethyl oxalate, diethyl oxalate, diethyl malonate, succinic anhydride, glutaric acid monomethyl ester, diethyl glutarate, adipic acid monomethyl ester, dimethyl adipate, dimethyl sebacate, isophthalic acid, terephthalic acid, dimethyl isophthalate, maleic anhydride, itaconic acid and dimethyl itaconate.

The following polyamines b) may be mentioned as examples: diethylenetriamine, triethylenetetramine, tetraethylenepentamine, pentaethylenehexamine, hexaethyleneheptamine, dipropylenetriamine, dihexamethylenetriamine, N-methyl-bis(3-aminopropyl)amine, tris(2-aminoethyl)amine, N-(2-aminoethyl)piperazine, bisaminoethylpiperazine, bisaminopropylpiperazine.

The following polyamines c) may be mentioned as examples: ethylenediamine, diaminopropane, 1,6-diaminohexane, N-(2-hydroxyethyl)ethylenediamine, N,N'-dimethylethylenediamine, N-methyl-1,3-diaminopropane, isophoronediamine, 4,4'-diamino-dicyclohexylmethane, piperazine.

Preferred lactams d) are, for example, caprolactam and laurolactam, and preferred aminocarboxylic acids d) are aminocaproic acid and 11-amino-undecanoic acid.

The polyamines A2) employed in the process according to the invention preferably correspond to the formula (I)

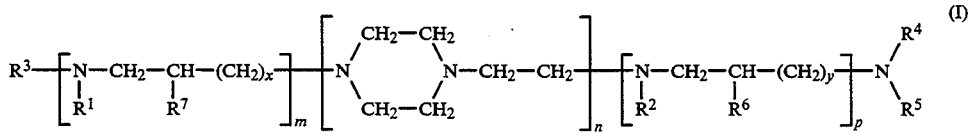

in which
x and y independently of one another represent 0 or 1,
m and p independently of one another represent 0 to 5,
$R^6$ and $R^7$ independently of one another represent H or methyl,
n represents 0 to 5,
$R^1$, $R^2$ and $R^3$ independently of one another represent H, methyl, ethyl, hydroxyethyl, hydroxypropyl or a radical of the formula (II)

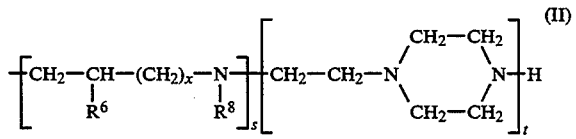

wherein
R$^8$ represents methyl or ethyl,
R$^6$ and x have the abovementioned meaning and
s and t independently of one another represent 0 to 3, and
R$^5$ and R$^4$ independently of one another represent H, methyl, ethyl, hydroxyethyl or hydroxypropyl, but at least one radical R$^4$ or R$^5$ represents H, or
R$^4$ and R$^5$ together represent a group of the formula —CH$_2$—CH$_2$—NH—CH$_2$—CH$_2$—, and
in the case where m, n and p represent zero, at least one of the substituents R$^3$, R$^4$ and R$^5$ is other than hydrogen.

Examples of particularly preferred polyamines A2) of the formula (I) are: diethylenetriamine, triethylenetetramine, tetraethylenepentamine, pentaethylenehexamine, hexaethyleneheptamine, dipropylenetriamine, dihexamethylenetriamine, N-methyl-bis-(3-aminopropyl)amine, tris(2-aminoethyl)amine, piperazine, bis(piperazinyl)ethane, N-(2-aminoethyl)-piperazine, bisaminoethylpiperazine and bisaminopropylpiperazine.

Instead of the pure polyamines A2), it is of course also possible to employ polyamine mixtures.

The reaction with acids C) serves to stabilise the polycondensates, basic N atoms still present being protonated.

Examples of acids C) which may be mentioned are: hydrochloric acid, sulphuric acid, nitric acid, phosphoric acid, formic acid, acetic acid, citric acid, malic acid, phosphonobutanetricarboxylic acid, malonic acid, propionic acid, tartaric acid, adipic acid, glutaric acid or mixtures thereof.

C) furthermore also is to be understood as meaning compounds which have an acid reaction, such as carboxylic acid anhydrides or acid salts, and examples which may be mentioned are: maleic anhydride, acetic anhydride, potassium bisulphate, sodium bisulphate, potassium dihydrogen phosphate or sodium dihydrogen phosphate. Hydrochloric acid, sulphuric acid, formic acid, acetic anhydride and acetic acid are preferably used as C).

The polyamidoamines A1) are prepared in the customary manner, for example by first heating components a) to d) to temperatures of between 100° and 150° C. and, after a maximum of three hours, further heating the resulting melt slowly to a maximum of 220° C. under normal pressure, the water formed being distilled off. To avoid discolourations, it is advantageous to carry out condensation with exclusion of oxygen, and if appropriate to add carboxylic acid hydrazides in small amounts. Distillation is carried out until less than 98% of the theoretical amount of water has been withdrawn from the equilibrium, that is to say 1 mol of water must be split off per mol of carboxyl group of the dicarboxylic acid.

After the melt polycondensation, the mixture is preferably diluted to a solids content of 25 to 60% by weight, particularly preferably of 40 to 55% by weight, by addition of water, since the polyamidoamines can be stored and further processed more easily in this dilute form.

Inert gases in the context of the invention are nitrogen, argon and air, nitrogen being preferred.

The polycondensate solutions obtained by the process according to the invention have a solids content of, for example, 5 to 30% by weight, preferably 10 to 25% by weight, particularly preferably 12 to 20% by weight, and a pH of between 2 and 5, preferably between 2.5 and 4. The viscosity of a 15% strength polycondensate solution at 25° C. is between 10 and 150 mPas, preferably between 20 and 80 mPas. The products have, for example, an average molecular weight (weight-average $\overline{M}_w$) of at least 1000, preferably between 1000 and 1,000,000 g/mol. The polycondensate solution is free from inorganic salts, since, according to the invention, no inorganic bases are employed to reduce the organic chlorine content.

The polycondensates obtainable according to the invention can be used as paper auxiliaries, above all to impart wet strength to paper or paper-like materials, such as paperboard or cardboard, and as textile auxiliaries for treatment of naturally occurring or synthetic fibre materials. The finishing is carried out in a manner which is known per se. In order to prepare a paper with high wet strength, a procedure is followed in which the aqueous solution of the polycondensate is added to a suspension of the fibre raw material, and the paper is formed therefrom by removal of water. For testing, sheets of paper having a weight per unit area of 50 to 100 g/m$^2$ are in general formed in the laboratory. The amounts employed depend on the effect sought. As a rule, however, amounts employed of 0.01 to 2% by weight, preferably 0.1 to 1.2% by weight of solid resin, based on the dry fibre raw material, are sufficient. Because of the rapid crosslinking during drying, for example of the paper web on a papermaking machine, the resins according to the invention provide good wet strength immediately after leaving the machine. The polycondensates are compatible with customary optical brighteners, and do not influence the absorbency of the paper. Furthermore, a soft handle of the paper can be produced for use in the hygiene paper sector.

There are also other fields of use outside the use in the paper sector, for example in the purification of industrial waste waters, or for breaking oil-in-water emulsions, for example cooling lubricant emulsions, rolling oil emulsions or, for example, emulsions such as are obtained during tertiary crude oil production. The polycondensates furthermore have the effect of intensifying the sizing action of reactive sizing agents, and can advantageously be employed in combination with cationic polymeric sizing agents.

Another important use form for the polycondensates is the use as crosslinking agents for binders in textile printing, such as are described, for example, in German Offenlegungsschrift 936 328 and German Offenlegungsschrift 3 914 047. Such binders comprise, for example, a polyamidoamine, a polycondensate prepared by the process according to the invention, as the crosslinking agent, and if appropriate homo- and copolymers of vinyl compounds, as well as other customary additives, such as, for example, pigments, urea or emulsifiers, it being possible for the content of polycondensates to be up to 60% by weight.

The process according to the invention in textile printing is carried out in practice in a manner which is known per se, for example by preparing a printing paste containing the basic polyamidoamine, the polycondensate according to the invention and if appropriate the polyvinyl compound, printing the fibre material with this printing paste on a printing unit, and then carrying out the condensation, if appropriate at elevated temperature.

The process according to the invention for the preparation of water-soluble self-crosslinking and storage-stable polycondensates is distinguished by the following advantages over the prior art:

The polycondensates contain considerably less organically bonded chlorine than known products.

The content of free epichlorohydrin in the end product is less than 50 ppm, based on the solid resin.

In spite of the small amount of epichlorohydrin employed, the polycondensates give surprisingly good wet strength values in the paper finished with them, and have an outstanding storage stability.

The process is:

particularly environment-friendly, easier to carry out than processes which employ inorganic bases for removal of the organically bonded halogen;

more effective, since side reactions in the reaction mixture are suppressed by optimum utilisation of the epichlorohydrin employed.

Compared with products according to the prior art, the products are more suitable for reducing the AOX load of paper manufacturing waste waters.

EXAMPLES

The comparison examples were reworked as accurately as possible. Slight deviations in the reaction times, temperatures or the amounts of water added resulted unavoidably in some cases, since only in this way could the stated product properties, such as viscosity and solids content, be achieved.

All the % data in the examples are % by weight.

The analytical results of the resins and the wet strength properties of representative paper sheets are given in Table 1.

Example 1 (comparison)

Example 1 of EP 0 374 938 A1 was reworked as follows.

a) Preparation of the polyamidoamine solution:

216.8 g (2.105 mol) of diethylenetriamine, 21 g of water and 292 g (2.0 mol) of adipic acid were subjected to condensation with the addition of 4 g (0.04 mol) of 98% strength sulphuric acid. For this, the mixture was first heated to 140° C. and stirred at this temperature for 1 hour. The temperature was kept at 155° to 160° C. for 12 hours, during which 93 g of water were distilled off. A polyamidoamine solution was then obtained by careful addition of water (450 g).

Solids content: 49.5%

Viscosity (25° C.): 480 mPas

Base equivalent weight: 401 g/basic N (solution).

b) Preparation of the polyamidoamine/epichlorohydrin resin:

120.3 g (0.3 mol) of the resulting polyamidoamine solution 1a) were diluted with 52.7 g of water. 33.3 g (0.36 mol) of epichlorohydrin were then added dropwise at 20° C. in the course of 30 minutes. The resulting solution (concentration=45%) was heated to 30° C. (first heating step).

After 16 hours, 59 g of water were added, and a concentration of 35.0% strength was thus established. Thereafter, the mixture was heated to 45° C. (second heating step). When the viscosity reached 200 mPas (25° C.), 333 g of water were added and the mixture was acidified to pH 3.4 with 3.8 g of 96% strength sulphuric acid.

Solids content: 15.5% (5 g, 150° C., 3 hours)

Viscosity (25° C.): 20 mPas. Example 2 (comparison)

a) The synthesis of the polyamidoamine according to Example 1 of EP 0 374 938 A1 was repeated. The product had the following data:

Solids content: 49.0%

Viscosity (25° C.): 450 mPas

Base equivalent weight: 406 g/basic N (solution).

b) The polyamidoamine/epichlorohydrin resin according to Example 3 of EP 0 374 938 A1 was reworked.

121.8 g (0.3 mol) of the polyamidoamine solution from Example 2 a) were diluted with 95 g of water. 25 g (0.27 mol) of epichlorohydrin were then added dropwise to the solution at 20° C. in the course of 15 minutes (concentration=35.0% strength). The resulting solution was stirred at 30° C. for 15 hours (first heating step).

The solution was then heated to 35° C. for further condensation. When the final viscosity of 300 mPas (25° C.) was reached, 287 g of water were added (concentration=16.0% strength), and a pH of 3.4 was established with 9.4 g of 96% strength sulphuric acid.

Solids content: 17.7%

Viscosity (25° C.): 36 mPas.

EXAMPLE 3 (comparison)

a) The synthesis of the polyamidoamine according to Example 3 of EP 0 374 938 A1 was repeated.

309 g (3.00 mol) of diethylenetriamine, 30 g of water and 416.1 g (2.85 mol) of adipic acid were subjected to a condensation reaction with addition of 9 g (0.09 mol) of 98% strength sulphuric acid. For this, the mixture was first heated to 140° C. and stirred at this temperature for 1 hour. The temperature was kept at 155° to 160° C. for 24 hours, during which 136.3 g of water were distilled off. A polyamidoamine solution was then obtained by careful addition of water (620 g).

Solids content: 50.3%

Viscosity (25° C.): 840 mPas

Base equivalent weight: 406 g/basic N (solution).

b) The polyamidoamine/epichlorohydrin resin according to Example 3 of EP 0 374 938 A1 was reworked.

125 g (0.307 mol) of the polyamidoamine solution were diluted with 101 g of water. 25 g (0.27 mol) of epichlorohydrin were then added dropwise to the solution at 20° C. in the course of 15 minutes (concentration=35.0%). The resulting solution was stirred at 30° C. for 6.75 hours. When the viscosity of 400 mPas (30° C.) was reached, 289 g of water were added (concentration=16.0% strength), and after a further 30 minutes at 30° C., the pH was brought to 2.8 with 12.2 g of 96% strength sulphuric acid. The solids content was then established.

Solids content: 15.5%

Viscosity (25° C.): 35 mPas.

Example 4 (comparison)

Example 8 of DE 3 822 490 A1 was reworked.

a) Preparation of the polyamidoamine according to Example 1 of DE 3 822 490 A1:

392 g (3.8 mol) of diethylenetriamine and 24.4 g (0.4 mol) of 2-amino-ethanol were introduced into a four-necked flask provided with stirrer, thermometer and distillation apparatus, and 584 g (4.0 mol) of adipic acid were added in portions in the course of 30 minutes, during which the temperature was kept below 110° C. The mixture was then heated to 150° C. under nitrogen in the course of 2 hours, and kept at this temperature for 1 hour. The mixture was slowly heated to 170° C. and kept at this temperature for about 3 hours, the water formed being distilled off. A sample of the polycondensate had an acid number of 19 mg of KOH/g. After removal of the heating, the mixture was diluted with 570 g of water. Solids content: 60.0% (5 g, 150° C., 3 hours) Viscosity (25° C.): 870 mPas Amine number: 249 mg of KOH/g, based on the solid resin Base equivalent weight: 375 g/basic N (solution)
Base equivalent weight: 225 g/basic N (solid resin).

b) Preparation of the polyamidoamine/epichlorohydrin resin according to Example 8 of DE 3 822 490 A1:

207 g (0,552 mol) of the polyamidoamine solution from Example 4 a) and 207 g of water were introduced into a four-necked flask with a stirrer, thermometer, condenser and pH electrode. 66.5 g (0.72 mol) of epichlorohydrin were added at 20° C., while stirring (concentration=39.7%). The mixture was heated to 60° C. in the course of 45 minutes. After 3.5 hours at this temperature, the viscosity (60° C.) was 175 mPas.

578 g of a 2.0% strength sodium hydroxide solution were then added, a pH of 10.8 being established, and the mixture was heated to 65° C. (concentration=19% strength). Stirring was continued at this temperature for 1.75 hours, until the viscosity wax 125 mPas (65° C.). The pH had since decreased to 7.9. 442 g of water, in which 1.5 g of potassium sorbate were dissolved, were then added, the mixture was cooled and the pH was then brought to 3.0 with 14.1 g of 96% strength sulphuric acid.

Solids content: 13.7% (5 g, 150° C., 3 hours)
Viscosity (25° C.): 80 mPas.

Example 5 (comparison)

Preparation of the polyamidoamine/epichlorohydrin resin according to Example 6 of DE 3 822 490 A1.

66.5 g (0.72 mol) of epichlorohydrin were added to 207 g (0.552 mol) of the polyamidoamine solution from Example 4 a) and 207 g of water in the apparatus used in Example 4b), while stirring. The mixture (concentration=39.6% strength) was heated to 60° C. in the course of 45 minutes, and kept at this temperature. After 2.5 hours, the viscosity (60° C.) was 155 mPas.

578 g of 1% strength sodium hydroxide solution were then added, during which the pH rose to 9.8. The mixture was heated to 65° C. (during which the pH dropped) and stirring was continued at this temperature until the viscosity was 120 mPas (65° C.) (about 45 minutes). 442 g of water in which 1.5 g of potassium sorbate were dissolved were then added, the mixture was cooled and the pH was then brought to 3.5 with 10.0 g of 96% strength sulphuric acid.

Solids content: 13.2% (5 g, 150° C., 3 hours)
Viscosity (25° C.): 40 mPas.

Example 6 (comparison)

In accordance with the doctrine and with Claims 1 to 6 of DE 3 822 490 A1, Example 6 of DE 3 822 490 A1 was modified such that only 0.7 mol of epichlorohydrin was employed per mol of basic (epichlorohydrin-reactive) amino group of the polyamidoamine.

35.7 g (0.386 mol) of epichlorohydrin were added to 207 g (0.552 mol) of the polyamidoamine solution of Example 4 a) and 160 g of water in the apparatus used in Example 4b), while stirring. The mixture (concentration=39.7% strength) was heated to 60° C. in the course of 45 minutes and kept at this temperature. After only 40 minutes, the viscosity rose very rapidly, so that in spite of immediate dilution with 312 g and then with 568 g of water and acidification to pH 3 with sulphuric acid, only a crosslinked gel was to be obtained. Dilution of the batch with a 1% strength sodium hydroxide solution (0.20 mol of NaOH per mol of epichlorohydrin, corresponding to Example 6 of DE 3 822 490 A1) would no longer have been possible. Testing was impossible.

Example 7 (comparison)

Example 6 was repeated with the modification that after the addition of epichlorohydrin, the mixture was subsequently stirred at 30° C. for 30 minutes and the condensation was carried out at a lower temperature. 35.7 g (0.386 mol) of epichlorohydrin were added dropwise to 207 g (0.552 mol) of the polyamidoamine solution from Example 4 a) and 160 g of water in the course of 30 minutes in the apparatus used in Example 4b), while stirring. After a further 60 minutes at 25° C., the mixture (concentration=39.7% strength) was heated to 45° C. in the course of 45 minutes and kept at this temperature. After 2.5 hours, a solution viscosity of 100 mPas (45° C.) was reached. The batch was diluted to a concentration of 22.8% strength with 312 g of a 1% strength sodium hydroxide solution (0.20 mol of NaOH per mol of epichlorohydrin, corresponding to Example 6 of DE 3 822 490 A1). During this procedure, a temperature of 36° C. and a pH of 8.5, which dropped further in the subsequent course of the condensation, were established. The temperature was increased again to 45° C. After 45 minutes, the mixture was diluted to a concentration of 12.7%, at a viscosity of 100 mPas (45° C.), with 588 g of water which contained 1.5 g of dissolved potassium sorbate. Stirring was continued for a further 8 minutes at 35° C., and the pH was then brought to 3.5 with 23.1 g of 96% strength sulphuric acid. A further sample was brought to a pH of 2.7. After only 48 hours, the sample of pH 3.5 could no longer be processed, since it was crosslinked.

Solids content: 14.2% (5 g, 150° C., 3 hours) Viscosity (25° C.): 75 mPas.

Example 8 (comparison to Example 9, without nitrogen)

a) Preparation of the polyamidoamine 211.5 g (2.05 mol) of diethylenetriamine were initially introduced into a reaction vessel with a gas inlet tube, stirrer, internal thermometer and column head. 292 g (2.0 mol) of adipic acid were added, while stirring, such that the temperature of the reaction mixture did not exceed 110° C. When the addition had ended, the mixture was heated to 150° C., while passing over nitrogen, and heated under reflux for 1 hour. The temperature was then increased to 190° to 195° C. in the course of 3 hours, during which the water of reaction was distilled off continuously. When the theoretical amount of water (72 g) had been distilled, and after cooling the melt to 170° C., the desired solids content was established by slow addition of water.

Solids content: 49.1% (5 g, 150° C., 3 hours)
Viscosity (25° C.): 470 mPas
Base equivalent weight: 414 g/basic N (solution)
Base equivalent weight: 203 g/basic N (solid resin).

b) Preparation of the polyamidoamine/epichlorohydrin resin

A mixture of 207 g (0.5 mol) of the polyamidoamine from Example 8 a) and 832.7 g of water was initially introduced into a four-necked flask with a stirrer, thermometer, reflux condenser, pH electrode and gas inlet tube. 32.4 g (0.350 mol) of epichlorohydrin were added dropwise at 20° C. in the course of 30 minutes (concentration=12.5% strength). The temperature was brought to 30° C. and the mixture was stirred for a further 180 minutes. It was then stirred at 50° C. for 60 minutes. After addition of 2.9 g (0.007 mol) of the polyamidoamine from Example 8 a), the temperature was increased to 55° C. When the reaction mixture had a solution viscosity of 50 mPas (25° C.) after a further 90 minutes at 55° C., it was brought to a pH of 2.8 with 12.8 g of 96% strength sulphuric acid.

Solids content: 13.8% (5 g, 150° C., 3 hours)
Viscosity (25° C.): 68 mPas.

Example 9 (according to the invention)

Preparation of the polyamidoamine/epichlorohydrin resin

A mixture of 207 g (0.5 mol) of the polyamidoamine from Example 8 a) and 834.3 g of water was initially introduced into a four-necked flask with a stirrer, thermometer, reflux condenser, pH electrode and gas inlet tube. 32.6 g (0.352 mol) of epichlorohydrin were added dropwise at 20° C. in the course of 30 minutes (concentration=12.5% strength). The temperature was increased to 30° C. and the mixture was stirred for a further 60 minutes. It was then stirred for a further 120 minutes, while passing a stream of nitrogen through the reaction solution. The temperature was then increased to 45° C. The mixture was stirred at 45° C. for 60 minutes, while continuing to pass in the stream of nitrogen, and after addition of 4.6 g (0.011 mol) of the polyamidoamine from Example 8 a), the temperature was increased slowly to 55° C. When the reaction mixture had a solution viscosity of 45 mPas (25° C.), it was brought to a pH of 2.7 with 12.2 g of 96% strength sulphuric acid.

Solids content: 13.9% (5 g, 150° C., 3 hours)
Viscosity (25° C.): 52 mPas.

Example 10 (according to the invention)

Preparation of the polyamidoamine/epichlorohydrin resin

A mixture of 207 g (0.5 mol) of the polyamidoamine from Example 8 a), 3.25 g (0.0224 mol) of N-methyl-bis(3-aminopropyl)amine and 887.8 g of water was initially introduced into a four-necked flask with a stirrer, thermometer, reflux condenser, pH electrode and gas inlet tube. 37.0 g (0.40 mol) of epichlorohydrin were added dropwise at 20° C. in the course of 30 minutes (concentration=12.5% strength). The mixture was subsequently stirred at 30° C. for 1 hour. It was then stirred at 30° C. for a further 2 hours, while passing in a stream of nitrogen. The temperature was then increased to 50° C. and the batch was kept at this temperature for 55 minutes. The temperature was then increased to 55° C. After 60 minutes at 55° C., 2.9 g (0.007 mol) of the polyamidoamine from Example 8 a) were added and the mixture was stirred at 60° C. for a further 60 minutes, until a solution viscosity of 55 mPas (25° C.) was reached. The pH was then brought to 2.7 with 12.5 g of 96% strength sulphuric acid.

Solids content: 13.7% (5 g, 150° C., 3 hours)
Viscosity (25° C.): 64 mPas.

Example 11 (according to the invention)

Example 9 was repeated, with the modification that 37.0 g (0.4 mol) of epichlorohydrin and 865 g of water were employed. The reaction time at 55° C. was about 5 hours, 3.7 g (0.009 mol) of polyamidoamine precursor being metered in after 55° C. was reached. The reaction was stopped at pH 2.6 with 9.8 g of 96% strength sulphuric acid.

Solids content: 13.4% (5 g, 150° C., 3 hours)
Viscosity (25° C.): 46 mPas.

Example 12 (according to the invention)

a) Analogously to Example 8 a), a polyamidoamine was prepared by condensation of 1372 g (9.398 mol) of adipic acid, 1041.5 g (10.112 mol) of diethylenetriamine and 424.5 g (3.757 mol) of caprolactam, the product having the following properties:

Solids content: 50.0% (5 g, 150° C., 3 hours)
Viscosity (25° C.): 330 mPas
Base equivalent weight: 419 g/basic N (solution)
Base equivalent weight: 209.5 g/basic N (solid resin).

b) Preparation of the polyamidoamine/epichlorohydrin resin

A mixture of 209.5 g (0.5 mol) of the polyamidoamine from Example 12 a) and 737.4 g of water was initially introduced into a four-necked flask with a stirrer, thermometer, reflux condenser, pH electrode and gas inlet tube. 32.4 g (0.35 mol) of epichlorohydrin were added at 20° C. (concentration=14% strength). The mixture was subsequently stirred at 23° to 25° C. for a total of 120 minutes, passing in of a stream of nitrogen being started 60 minutes after addition of the epichlorohydrin had ended. The temperature was then increased to 60° C. The mixture was stirred at 60° C. for about 3 hours, while continuing to pass in the stream of nitrogen. When the reaction mixture had a solution viscosity of 55 mPas (25° C.), it was brought to a pH of 2.4 with 11 g of 96% strength sulphuric acid.

Solids content: 14.6% (5 g, 150° C., 3 hours)
Viscosity (25° C.): 64 mPas.

Example 13 (according to the invention)

Example 12b) was repeated, with the modification that 41.6 g (0.45 mol) of epichlorohydrin and 794.1 g of water were employed. The mixture was stirred at 23° C. for 3 hours. It was then stirred at 55° C. for 4.5 hours, and the reaction was stopped at a solution viscosity of 85 mPas (25° C.) with 10.9 g of 6% strength sulphuric acid.

Solids content: 15.2% (5 g, 150° C., 3 hours)
Viscosity (25° C.): 95 mPas.

Example 14 (according to the invention)

a) Preparation of the polyamidoamine 211.5 g (2.05 mol) of diethylenetriamine were initially introduced into a reaction vessel with a gas inlet tube, stirrer, internal thermometer and column head. 292 g (2.0 mol) of adipic acid were added, while stirring, such that the temperature of the reaction mixture did not exceed 110° C. When the addition had ended, the mixture was heated to 150° C., while passing over nitrogen, and heated under reflux for 1 hour. The temperature was then increased to 190° to 195° C. in the course of 3 hours, during which the water of reaction was distilled off continuously. When the theoretical amount of water (72 g) had distilled off, and after cooling the melt to 170° C., the desired solids content was established by slow addition of water.

Solids content: 49.0% (5 g, 150° C., 3 hours)
Viscosity (25° C.): 470 mPas.
Base equivalent weight: 406 g/basic N (solution)
Base equivalent weight: 198.9 g/basic N (solid resin)

b) 203 g (0.5 mol) of the polyamidoamine solution from Example 14 a) were diluted with 211.5 g of water and the solution was heated under reflux with 5.53 g (0.05 mol) of 1-chloro-propanediol for 6 hours.

229.8 g (0.25 mol) of this solution were diluted with 279.9 g of water, and 16.2 g (0.175 mol) of epichlorohydrin were added at 23° C. The mixture was subsequently stirred at 25° C. for 1 hour, while passing in a stream of nitrogen, and was then heated to 55° C. After about 3.5 hours while passing in $N_2$ at 55° C., the viscosity (25° C.) had risen to 53 mPas. The batch was acidified to pH 2.5 with 6.5 g of 96% strength sulphuric acid.

Solids content: 15.4% (5 g, 150° C., 3 hours)
Viscosity (25° C.): 57 mPas.

Example 15 (according to the invention)

a) Analogously to Example 8 a), a polyamidoamine was prepared by condensation of 584.4 g (4.0 mol) of adipic acid, 402.4 g (3.9 mol) of diethylene triamine and 12.0 g (0.2 mol) of ethylenediamine, the product having the following properties:

Solids content: 50.0% (5 g, 150° C., 3 hours)
Viscosity (25° C.): 375 mPas
Base equivalent weight: 388 g/basic N (solution)
Base equivalent weight: 194 g/basic N (solid resin).

b) Preparation of the polyamidoamine/epichlorohydrin resin

A mixture of 177.5 g (0.457 mol) of the polyamidoamine from Example 15 a) and 676.9 g of water were initially introduced into a four-necked flask with a stirrer, thermometer, reflux condenser, pH electrode and gas inlet tube. 32.4 g (0.35 mol) of epichlorohydrin were added at 20° C. (concentration=14.0% strength). The mixture was subsequently stirred at 23° to 25° C. for 60 minutes, while passing in a stream of nitrogen. The temperature was then increased to 55° C. The mixture was stirred at 55° C. for about 3.5 hours, while continuing to pass in the stream of nitrogen. When the reaction mixture had a solution viscosity of 35mPas (25° C.), it was brought to a pH of 2.8 with 9.2 g of 96% strength sulphuric acid.

Solids content: 14.8% (5 g, 150° C., 3 hours)
Viscosity (25° C.): 37 mPas.

Example 16 (according to the invention)

a) Analogously to Example 8 a), a polyamidoamine was prepared by condensation of 1168 g (8.0 mol) of adipic acid, 758.8 g (7.36 mol) of diethylene triamine and 84.4 g (0.652 mol) of 2-aminoethylpiperazine, the product having the following properties:

Solids content: 52.5% (5 g, 150° C., 3 hours)
Viscosity (25° C.): 430 mPas
Base equivalent weight: 390 g/basic N (solution)
Base equivalent weight: 204.8 g/basic N (solid resin).

b) Preparation of the polyamidoamine/epichlorohydrin resin

A mixture of 195 g (0.5 mol) of the polyamidoamine from Example 16 a) and 861.3 g of water was initially introduced into a four-necked flask with a stirrer, thermometer, reflux condenser, pH electrode and gas inlet tube. 33.9 g (0.366 mol) of epichlorohydrin were added dropwise at 20° C. in the course of 30 minutes (concentration=12.5% strength). The mixture was subsequently stirred at 23° to 25° C. for a total of 180 minutes, passing in of a stream of nitrogen being started 60 minutes after addition of the epichlorohydrin had ended. The temperature was then increased to 45° C. After 60 minutes, the mixture was heated to 50° C. 5.3 g of the polyamidoamine solution from Example 16 a) was subsequently metered in. The mixture was stirred at 60° C. for about a further 1.5 hours, while continuing to pass in the stream of nitrogen. When the reaction mixture had a solution viscosity of 60 mPas (25° C.), it was brought to a pH of 2.7 with 12.1 g of 96% strength sulphuric acid.

Solids content: 13.3% (5 g, 150° C., 3 hours)
Viscosity (25° C.): 69 mPas.

To further illustrate the subject matter of the invention, the following experiments which show the effects of nitrogen degassing were carried out:

Example A (comparison without $N_2$)

(corresponding to the lowest molar ratio of epichlorohydrin/basic nitrogen and the lowest concentration according to the data of EP-A 0 374 938):

a) Preparation of the polyamidoamine solution according to Example 3 of EP-A 0 374 938:

309 g (3.0 mol) of diethylenetriamine, 30 g of water and 416.2 g (2.85 mol) of adipic acid were subjected to condensation with the addition of 9 g (0.09 mol) of concentrated sulphuric acid. For this, the mixture was first heated to 140° C. and stirred at this temperature for 1 hour. The temperature was kept at 155° to 160° C. for 12 hours, 136.3 g of water being distilled off. A polyamidoamine solution was then obtained by careful addition of water.

Solids content: 50.3%
Viscosity (25° C.): 840 mPas
Base equivalent weight: 406 g/basic N (solution)

b) Preparation of the polyamidoamine/epichlorohydrin resin:

203 g (0.5 mol) of the polyamidoamine solution obtained in Example A)a) were diluted with 464.7 g of water. 39.3 g (0.425 mol) of epichlorohydrin were then added dropwise at 24° C. in the course of 30 minutes. After 3 hours at 25° C., the resulting solution (concentration=20.0%) was heated to 50° C. After 70 minutes, 235.7 g of water were added, and a concentration of 15% strength was thus established. After a further 30 minutes, the mixture was acidified to pH 2.8 with 13.1 g of 96% strength sulphuric acid.

Solids content: 15.0% (5 g, 150° C., 3 hours)
Viscosity (25° C.): 75 mPas.

Example B (according to the invention, with $N_2$)

(corresponding to the lowest molar ratio of epichlorohydrin/basic N and the lowest concentration according to the data of EP-A 0 374 938):

Preparation of the polyamidoamine/epichlorohydrin resin:

203 g (0.5 mol) of the polyamidoamine solution obtained in Example A) under a) were diluted with 464.7 g of water. 39.3 g (0.425 mol) of epichlorohydrin were then added dropwise at 24° C. in the course of 30 minutes. After 60 minutes, passing in of nitrogen was started. After 3 hours at 25° C., the resulting solution (concentration=20.0% strength) was heated to 50° C. After 30 minutes, 235.7 g of water were added, and a concentration of 15% strength was thus established. After a further 25 minutes, the mixture was acidified to pH 2.8 with 17.2 g of 96% strength sulphuric acid.

Solids content: 15.0% (5 g, 150° C., 3 hours)
Viscosity (25° C.): 67 mPas.

Use Example

Bleached pine sulphate pulp was beaten at a consistency of 2.5% in a Holländer to a Schopper-Riegler degree of beating of 38°. 100 g of this product were introduced into a glass beaker and diluted to 1000 ml with water. 0.3% by weight, 0.6% by weight and 0.9% by weight of solid resin, based on the fibre material, of the products prepared according to the examples were introduced into the glass beaker as an aqueous solution.

After a stirring time of 3 minutes, sheets of paper having a weight per unit area of about 80 g/m² were formed on a sheet former (rapid Köthen unit) with the contents of the glass beakers. The sheets of paper were dried at 90° C. for 6 minutes under a vacuum of 20 mm Hg, and were after-heated in a drying cabinet at 110° C. for a further 15 minutes.

After the conditioning, 5 test strips of 1.5 cm width were cut out of each sheet of paper and immersed in distilled water for 5 minutes. The wet breaking load of the wet strips was then tested immediately in a tensile tester. A commercially available wet strength agent having a high organic chlorine content was furthermore also tested as a standard. The wet breaking loads obtained with the samples at various concentrations were related to the corresponding measurement values of the standard. The arithmetic means of the quotients thus obtained were obtained and, after multiplication by 100, were stated as the relative wet strength, based on the standard. The lower the numerical value, the poorer the wet strength action of the wet strength agent.

The test results are summarised in Table 1.

TABLE 1

| | Analytic results and relative wet strengths (the analytical data relate to the solid resin) | | | | | | | |
|---|---|---|---|---|---|---|---|---|
| Example | Solid [% by weight] | Viscosity [mPas] | pH | DCP [% by weight] | CPD [% by weight] | Total Cl [% by weight] | Organic Cl [% by weight] | Relative wet strength |
| Comparison Examples | | | | | | | | |
| 1 | 15,5 | 20 | 3,4 | 4,06 | 0,52 | 13,74 | 5,29 | 103,5 |
| 2 | 17,7 | 36 | 3.4 | 0,33 | 0,16 | 11,17 | 7,04 | 80,9 |
| 3 | 15,5 | 35 | 2,8 | 0,26 | 0,032 | 9,61 | 7,35 | 88,9 |
| 4 | 13,7 | 80 | 2,7 | 0,75 | 0,80 | 12,62 | 2,41 | 97,3 |
| 5 | 13,2 | 40 | 3,5 | 2,14 | 0,81 | 12,27 | 2,95 | 103,2 |
| 6 | — | cross-linked | — | — | — | — | — | — |
| 7 | 14,2 | 75 | 2,7 | 0,014 | 0,085 | 7,96 | 3,87 | 69,6* |
| 8 | 13,8 | 68 | 2,8 | 0,38 | 0,95 | 8,26 | 1,81 | 93,3 |
| Examples according to the invention | | | | | | | | |
| 9 | 13,9 | 52 | 2,6 | 0,115 | 0,165 | 7,99 | 1,58 | 97,1 |
| 10 | 13,7 | 64 | 2,7 | 0,190 | 0,234 | 8,76 | 1,61 | 97,2 |
| 11 | 13,4 | 46 | 2,6 | 0,150 | 0,35 | 9,10 | 1,72 | 91,3 |
| 12 | 14,6 | 64 | 2,4 | 0,212 | 0,05 | 8,36 | 1,44 | 97,6 |
| 13 | 15,2 | 95 | 2,7 | 0,164 | 0,10 | 9,61 | 1,71 | 99,3 |
| 14 | 15,4 | 57 | 2,5 | 0,170 | 0,09 | 8,90 | 1,75 | 95,5 |
| 15 | 14,8 | 37 | 2,8 | 0,115 | 0,07 | 9,46 | 2,23 | 92,1 |
| 16 | 13,3 | 69 | 2,7 | 0,211 | 0,271 | 8,57 | 1,43 | 98,9 |
| Additional experiments in accordance with EP 0 374 938: A not according to the invention B according to the invention | | | | | | | | |
| A | 15,0 | 75 | 2,7 | 0,474 | 0,493 | 9,70 | 5,57 | 93,3 |
| B | 15,0 | 67 | 2,8 | 0,199 | 0,236 | 9,12 | 4,91 | 95,9 |

*premature crosslinking after 1 week (storage stability inadequate)

We claim:

1. A process for the preparation of a polycondensate comprising reacting at least one of
   (A1) a basic polyamidoamine and
   (A2) a polyamine, which optionally contains hydroxyl groups with
   (B) 0.3 to 1 mol of epichlorohydrin per mol of the total basic N atoms present in components (A1) and (A2) in a solvent wherein the total concentration of components (A1), (A2), in solvent employed at the start of the reaction does not exceed 35% by weight, thereby to effect partial crosslinking, passing an inert gas through the reaction mixture before and optionally also during the partial crosslinking, and subsequently reacting the partially crosslinked product with an acid(C).

2. The process according to claim 1, wherein 0.3 to 0.85 mol of components (B) are employed per mol of the total basic N atoms present in components (A1) and (A2).

3. The process according to claim 1, wherein the total concentration of components (A1), (A2) and (B) in the solvent at the start of the reaction is 12 to 19% by weight.

4. The process according to claim 1, wherein the passing through of an inert gas is started at the earliest 30 minutes after addition of the epichlorohydrin has ended, and is continued until the content of free epichlorohydrin in the reaction mixture is less than 0.1% by weight, before the partial crosslinking is started.

5. The process according to claim 1, wherein the reaction of components (A1) and (A2) with (B) is carried out at a temperature below 35° C. and the temperature for the partial crosslinking is then increased to 35° to 80° C.

6. The process according to claim 1, wherein the inert gas is circulated.

7. The process according to claim 1, wherein the basic polyamidoamine (A1) is a condensation product which comprises structural units which are derived from a) at least one of an aromatic dicarboxylic acid ester or anhydride thereof, b) a polyamine which contains at least two amino groups which are capable of amide formation and at least one further secondary or tertiary amino group, c) optionally a polyamine which contains two amino groups which are capable of amide formation, and d) optionally at least one of an omega-aminocarboxylic acid or lactam, 0.8 to 1.2 mol of component (b), up to 0.8 mol of component (c) and up to 1.5 mol of component (d) being employed per mol of component (a), with the proviso that the molar ratio of (b)+(c):a is between 0.8:1 and 1.2:1.

8. The process according to claim 1, wherein the polyamine (A2) has the formula (I)

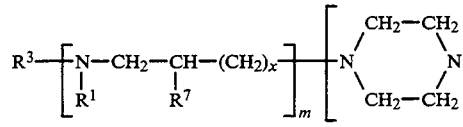

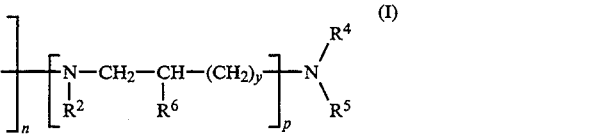

in which
x and y independently of one another represent 0 or 1,
m and p independently of one another represent 0 to 5,
$R^6$ and $R^7$ independently of one another represent H or methyl,
n represents 0 to 5,
$R^1$, $R^2$ and $R^3$ independently of one another represent H, methyl, ethyl, hydroxyethyl, hydroxypropyl or a radical of the formula (II)

wherein
$R^8$ represents methyl or ethyl and
s and t independently of one another represent 0 to 3 and
$R^5$ and $R^4$ independently of one another represent H, methyl, ethyl, hydroxethyl or hydroxypropyl, but at least one radical $R^4$ or $R^5$ represents H, or
$R^4$ and $R^5$ together represent a group of the formula —$CH_2$—$CH_2$—NH—$CH_2$—$CH_2$—, and
in the case where m, n and p represent zero, at least one of the substituents $R^3$, $R^4$ and $R^5$ is other than hydrogen 9. The process according to claim 1, wherein the acid (c) is at least one of that hydrochloric acid, sulphuric acid, formic acid, acetic anhydride and acetic acid.

* * * * *

UNITED STATES PATENT AND TRADEMARK OFFICE
CERTIFICATE OF CORRECTION

PATENT NO. : 5,434,222
DATED : July 18, 1995
INVENTOR(S) : Reiners, et al.

It is certified that error appears in the above-indentified patent and that said Letters Patent is hereby corrected as shown below:

Col. 18, line 58   After " an " insert -- aliphatic and --

Signed and Sealed this

Thirteenth Day of February, 1996

Attest:

BRUCE LEHMAN

Attesting Officer        Commissioner of Patents and Trademarks